United States Patent
Hemes et al.

(10) Patent No.: US 11,741,759 B2
(45) Date of Patent: Aug. 29, 2023

(54) APPARATUS AND METHOD FOR INDICATING RESIDUAL DRIVING RANGE

(71) Applicant: JAGUAR LAND ROVER LIMITED, Coventry (GB)

(72) Inventors: Elliot Hemes, Warwickshire (GB); Sam Anker, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 77 days.

(21) Appl. No.: 16/020,074

(22) Filed: Jun. 27, 2018

(65) Prior Publication Data

US 2019/0043270 A1  Feb. 7, 2019

(30) Foreign Application Priority Data

Aug. 4, 2017 (GB) ..................... 1712527

(51) Int. Cl.
*G07C 5/00* (2006.01)
*B60L 58/13* (2019.01)

(52) U.S. Cl.
CPC .............. *G07C 5/004* (2013.01); *B60L 58/13* (2019.02); *B60L 2260/52* (2013.01)

(58) Field of Classification Search
CPC ............................ G07C 5/004; B60L 2260/52
See application file for complete search history.

(56) References Cited

U.S. PATENT DOCUMENTS

| 10,214,216 | B2 | 2/2019 | Ireland | |
|---|---|---|---|---|
| 2011/0307130 | A1* | 12/2011 | Gow | B60L 3/102 701/22 |
| 2012/0179318 | A1* | 7/2012 | Gilman | B60W 50/14 340/455 |
| 2013/0173097 | A1* | 7/2013 | Jotanovic | G01C 21/3469 701/1 |

(Continued)

FOREIGN PATENT DOCUMENTS

| DE | 10 2011 108 385 B3 | 6/2012 |
|---|---|---|
| GB | 2385963 A | 9/2003 |
| GB | 2545527 A | 6/2017 |

OTHER PUBLICATIONS

Search and Examination Report, GB1712527.9, dated Feb. 2, 2018, 5 pages.

(Continued)

*Primary Examiner* — Imran K Mustafa
(74) *Attorney, Agent, or Firm* — McCoy Russell LLP

(57) ABSTRACT

Embodiments of the present invention provide a controller for indicating a residual driving range available in a battery of an electric vehicle. The controller is operable in a first mode wherein it instructs the output means to display an output indicative of the total amount of energy remaining in the battery and a second mode wherein it instructs the output means to display an output indicative of an amount of energy that may be used without causing the total amount of energy stored in the battery to reduce below an amount required to undertake a predetermined journey. The controller is operable to switch from the first mode to the second mode upon (Continued)

receipt of a user input via said second input means. Advantageously, the second mode may display an amount of energy that can be used in a leisure driving session.

14 Claims, 6 Drawing Sheets

(56) References Cited

U.S. PATENT DOCUMENTS

| | | |
|---|---|---|
| 2015/0073636 A1 | 3/2015 | Machino |
| 2018/0141555 A1* | 5/2018 | Jung .................... B60W 50/14 |
| 2018/0143029 A1* | 5/2018 | Nikulin .............. G01C 21/3415 |

OTHER PUBLICATIONS

Search Report, DE 10 2018 211 779.9, dated Jul. 16, 2018, Machine Translation (English).

* cited by examiner

APPARATUS AND METHOD FOR INDICATING RESIDUAL DRIVING RANGE

CROSS REFERENCE TO RELATED APPLICATION

This application claims priority to and the benefit of GB1712527.9 filed Aug. 4, 2017, which is incorporated by reference herein in its entirety.

TECHNICAL FIELD

The present disclosure relates to an apparatus and a method for indicating residual driving range. Aspects of the invention relate to a controller, to a display system, to a vehicle and to a method.

BACKGROUND

Range prediction is a particular problem faced by manufacturers of all types of vehicle, but accurate range prediction is especially important in electric vehicles. This is because as the availability of charging locations for electric vehicles is currently relatively limited as compared to the availability of fuel filling stations for vehicles powered by combustion engines. Furthermore, charging an electric vehicle is typically significantly more time consuming than filling the fuel tank of a vehicle powered by a combustion engine. Accordingly, it can be particularly important to ensure that a driver of an electric vehicle is provided with an accurate estimation of their remaining range to ensure that they do not attempt a journey that the vehicle had not got sufficient stored energy to complete.

Prior art vehicles may estimate a remaining range based on an average energy consumption per unit distance traveled during a preceding period. However, this approach may not produce accurate predictions in the event that a driver changes their behaviour part way through a journey.

It is an object of embodiments of the invention to at least mitigate one or more of the problems of the prior art.

SUMMARY

Aspects and embodiments of the invention relate to a controller, to a display system, to a vehicle and to a method as claimed in the appended claims.

According to an aspect of the invention for which protection is sought there is provided a controller for indicating a residual driving range available in an energy storage unit of a vehicle, the controller comprising a first input means arranged to receive an input indicative of a state of charge of a battery of the vehicle, a second input means arranged to receive a user input, output means arranged to cause an output to be displayed to a user of the vehicle, and processing means arranged to communicate with said first and second input means and said output means, wherein:
  the controller is operable in a first mode wherein the processing means is arranged to instruct the output means to display an output indicative of the total amount of energy remaining in the battery;
  the controller is operable in a second mode wherein the processing means is arranged to instruct the output means to display an output indicative of an amount of energy that may be used without causing the total amount of energy stored in the battery to reduce below an amount required to undertake a predetermined journey; and
  the controller is operable to switch from the first mode to the second mode upon receipt of a user input via said second input means. The energy storage unit may be a battery of an electric vehicle or a fuel tank of a vehicle powered by a combustion engine.

Advantageously, such a controller is operable to provide an indication of how much energy can be used in a leisure driving session. Furthermore, a change in the amount of energy used per unit distance traveled during the leisure driving session will not lead a user to believe that they have insufficient remaining energy to complete the predetermined journey, as would be the case with prior art systems that estimate overall range based on observed energy efficiency.

In an embodiment the output indicative of the total amount of energy remaining in the battery comprises an estimate of the total distance that may be driven before the battery is depleted based on the input received via the first input means. Advantageously, this allows a user to determine how much further they may drive in a leisure driving session.

In another embodiment, upon receipt of the input from the user of the vehicle the controller is configured to calculate an amount of energy required to undertake the predetermined journey, and in the second mode the controller is arranged to instruct the output means to display an output indicative of the total amount of energy remaining in the battery less the amount of energy required to undertake the predetermined journey. Optionally, the controller is configured to re-calculate the amount of energy required to undertake the predetermined journey during operation in the second mode. Advantageously, this may lead to the indication of the amount of energy that can be used causing the total amount of energy stored in the battery to reduce below an amount required to undertake a predetermined journey to change if the prevailing conditions indicate that a different amount of energy will be needed to complete the predetermined journey. This may be the case if the current traffic is significantly heavier than originally expected In an embodiment the destination of the predetermined journey is a charging location.

Optionally, the second mode is a leisure mode and the user input is indicative of a desire to transition the vehicle into the leisure mode. Further optionally, transition into the leisure mode is indicative of an intention to drive the vehicle off-road or on a race track. Such an indication may suggest that the amount of energy used per unit distance traveled is likely to change as compared to operation before leisure mode was initiated.

According to a further aspect of the invention for which protection is sought there is provided a display system for a vehicle comprising a controller as described above and a display means operable to communicate with the output means. Optionally, the display system further comprises a user interface operable by a user to provide said user input. Further optionally the display means is a touch screen and the user interface is the touch screen. Accordingly the touch screen may be the display means and the input means.

According to another aspect of the invention for which protection is sought there is provided a method of controlling a display of a vehicle, the method comprising:
  when operating in a first mode, displaying an output indicative of the total energy remaining in an energy storage unit of the vehicle;
  when operating in a second mode, displaying an output indicative of an amount of energy that may be used without causing the total amount of energy stored in the energy storage unit to reduce below an amount required to undertake a predetermined journey; and transitioning from the first mode to the second mode in response to a user input. The energy storage unit may be a battery and the vehicle may be an electric vehicle.

In an embodiment the output indicative of the total amount of energy remaining in the battery comprises an estimate of the total distance that may be driven before the battery is depleted based on an input received from a battery controller.

In another embodiment the method comprises calculating an amount of energy required to undertake the predetermined journey upon receipt of the user input, and when operating in the second mode, displaying an output indicative of the total amount of energy remaining in the battery less the amount of energy required to complete the predetermined journey.

Optionally, the method comprises re-calculating the amount of energy required to undertake the predetermined journey during operation in the second mode.

In an embodiment, the destination of the predetermined journey is a charging location.

Optionally, the second mode is a leisure mode and the user input is indicative of a desire to transition the vehicle into the leisure mode.

In an embodiment the transition into the leisure mode is indicative of an intention to drive the vehicle off-road or on a race track.

In another embodiment the user input is provided via a touch screen. Such a touch screen may also function as an output means on which the indication of the amount of energy remaining can be displayed.

According to another aspect of the invention for which protection is sought there is provided a controller comprising a processing means and a memory means, wherein the memory means comprises instructions that, when executed by the processor, cause the processor to implement a method as described above.

According to another aspect of the invention for which protection is sought there is provided a vehicle comprising a display system as described above or a controller as described above. The vehicle can be an electric vehicle.

BRIEF DESCRIPTION OF THE DRAWINGS

Embodiments of the invention will now be described by way of example only, with reference to the accompanying figures, in which.

DETAILED DESCRIPTION OF THE EMBODIMENTS

Figure 1:
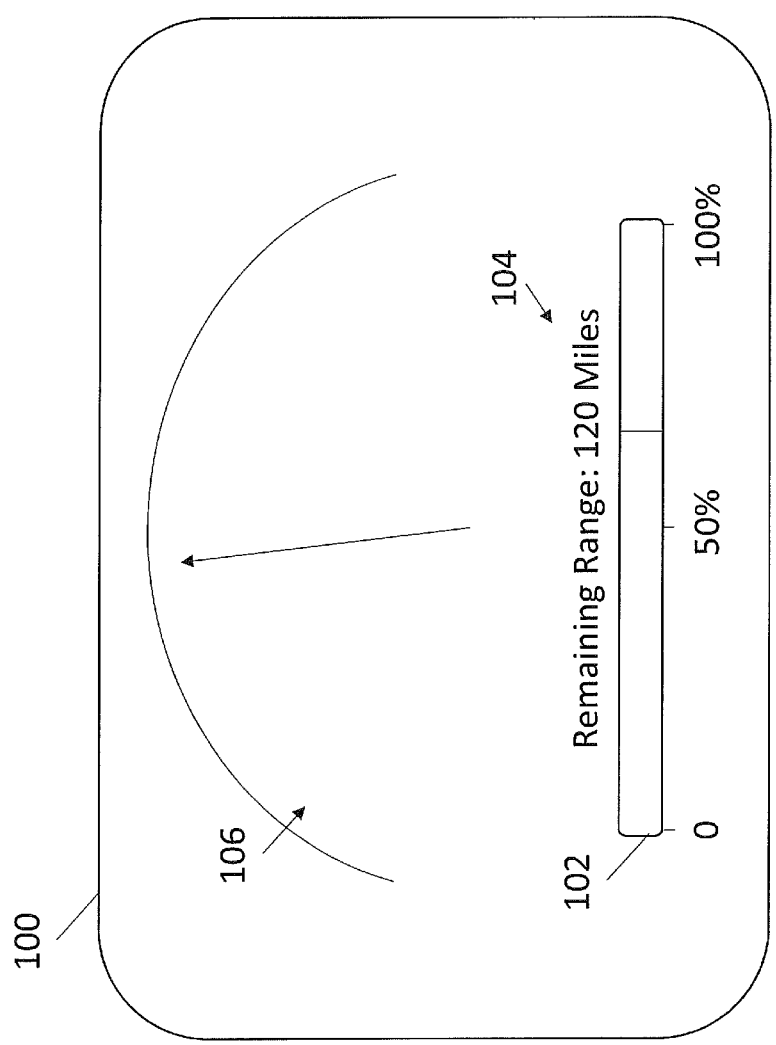
FIG. 1 shows an output of a display of a vehicle indicating a remaining amount of energy (PRIOR ART)

It is known for electric and non-electric vehicles to display a remaining range to a driver. FIG. 1 shows an example of a prior art vehicle display 100 having a bar graph 102 indicating the proportion of the total battery capacity that is still available and a numerical indication 104 of the remaining range before the vehicle must be refueled or recharged. The display also outputs an indication of the current vehicle speed on speedometer 106. For an electric vehicle the remaining range will typically be calculated in dependence on the amount of available energy remaining in the battery (i.e. the state of charge of the battery) and an assumed energy consumption per unit distance traveled. The assumed energy consumption may be adjusted based on a driving style of the driver or a driving mode that the vehicle is currently operating in. For example, the assumed energy consumption per unit distance traveled may be increased if the vehicle is operating in a "Sport" mode and/or if the driver has an aggressive driving style, and it may be reduced if the vehicle is operating in an "Eco" mode.

The present inventors have recognised that prior art range estimations are not able to account for planned changes in driving style that may occur during a journey.

Figure 2:
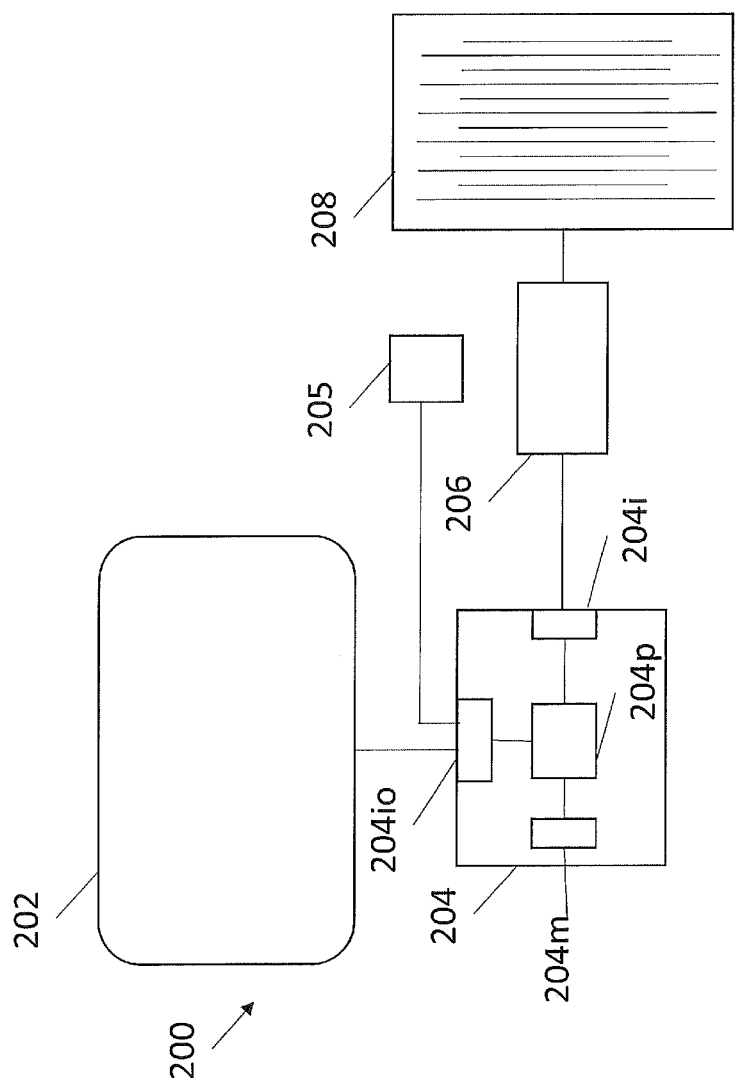
FIG. 2 shows a display system of a vehicle in an embodiment of the present invention.

FIG. 2 shows a display system 200 in an embodiment of the present invention. The system 200 comprises a touch screen 202 and a controller 204. The controller 204 comprises a processing means 204p that is operable to send signals to the touch screen and receive signals from the touch screen via input/output means 204io. The processing means 204p is in communication with a memory means 204m, which stores instructions and data for use by the processing means 204p. The processing means 204p is also operable to receive a signal indicative of a state of charge of a battery 208 via input means 204i, which is operable to communicate with battery controller 206. The controller is also operable to communicate with a GPS system 205.

Figure 3:
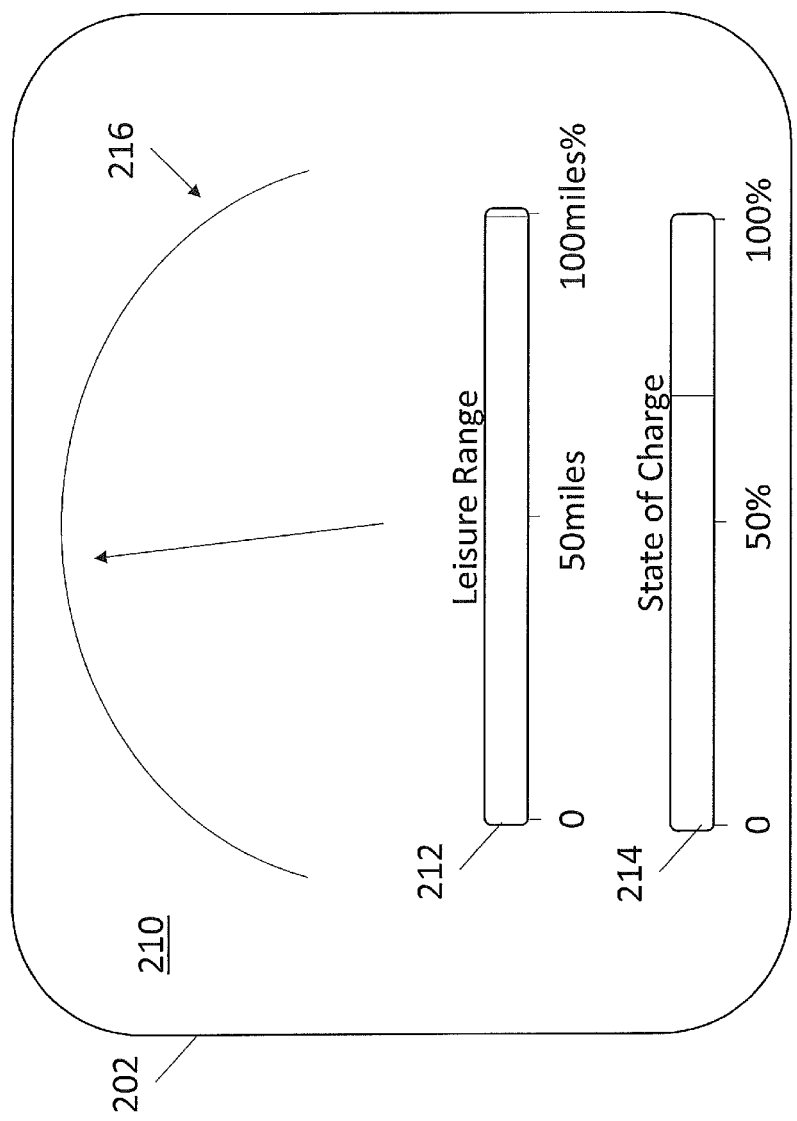
FIG. 3 shows an output of a display means according to an embodiment of the present invention.

The system 200 is operable in a leisure driving mode in which the controller 204 controls the display 202 to produce an output 210 similar to that shown in FIG. 3. In output 210 a driver is provided with a graph 212 indicating the total remaining range that can be used in leisure mode. The remaining range available in leisure mode is indicative of an amount of energy that may be used without causing the total amount of energy stored in the battery to reduce below an amount required to undertake a predetermined return journey. Display 210 also shows a graph 214 indicating the proportion of the total battery capacity that is still available and an indication of the current vehicle speed on speedometer 216. It will be understood that in some embodiments the leisure range may be displayed as a numerical indication of the remaining range that can be used in the leisure mode rather than a graph 212. Furthermore, although the graph 212 shows an indication of the leisure range as an estimated distance that the vehicle may be able to cover, it will be understood that the system could alternatively display an output indicative of the proportion of the leisure capacity (i.e. the energy that could be used in the leisure mode without causing the state of charge of the battery to drop below that required to complete the return journey). In this case the graph 212 would indicate 100% (or a similar indication of full capacity) when the leisure mode is initiated and would reduce to zero when the amount of charge remaining in the battery was equal to the amount required to undertake the return journey.

It will be understood that in some embodiments the speedometer 216 and the indication of the overall battery state of charge 214 may not be presented on the display 202. They may not be shown at all, or they may be displayed on a separate display. Use of the system 200 and the calculation of the remaining leisure range to display when the system is operating in the leisure mode will now be described with respect to FIGS. 4 and 5.

Figure 4:
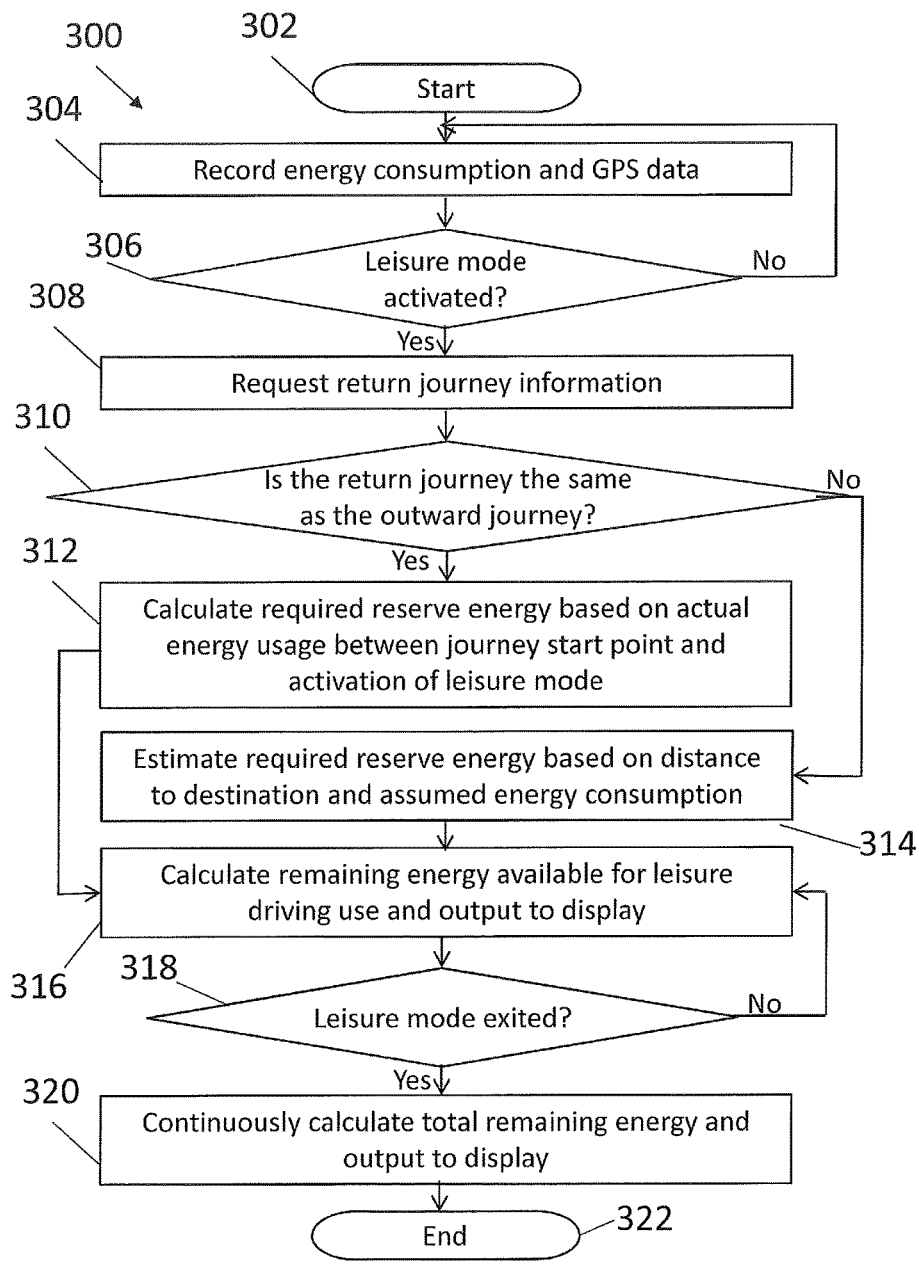
FIG. 4 shows a flow chart illustrating a method of controlling an output of a display of a motor vehicle in an embodiment of the present invention.
Figure 5:
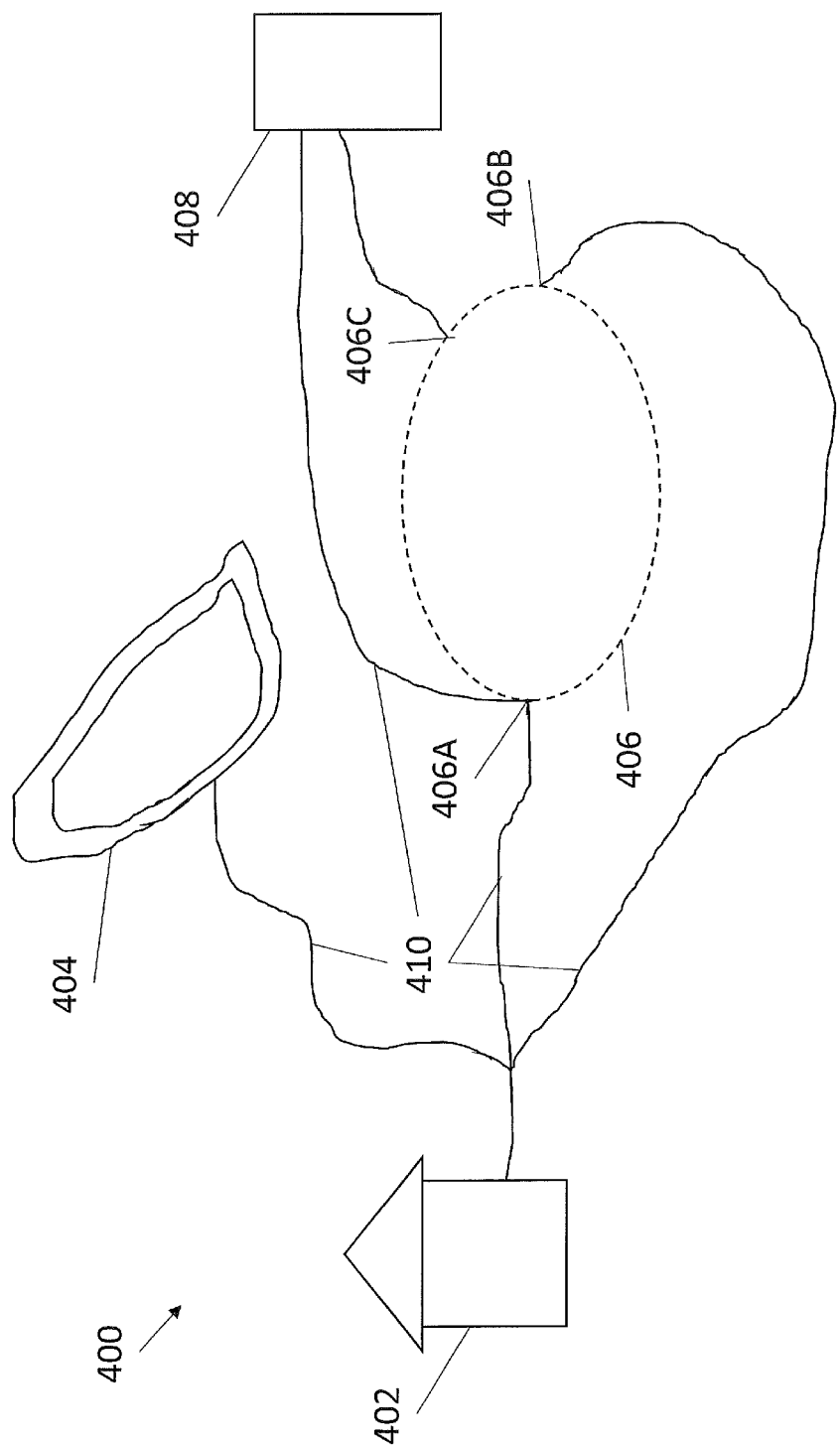
FIG. 5 shows a simplified map displaying route information.
Figure 6:
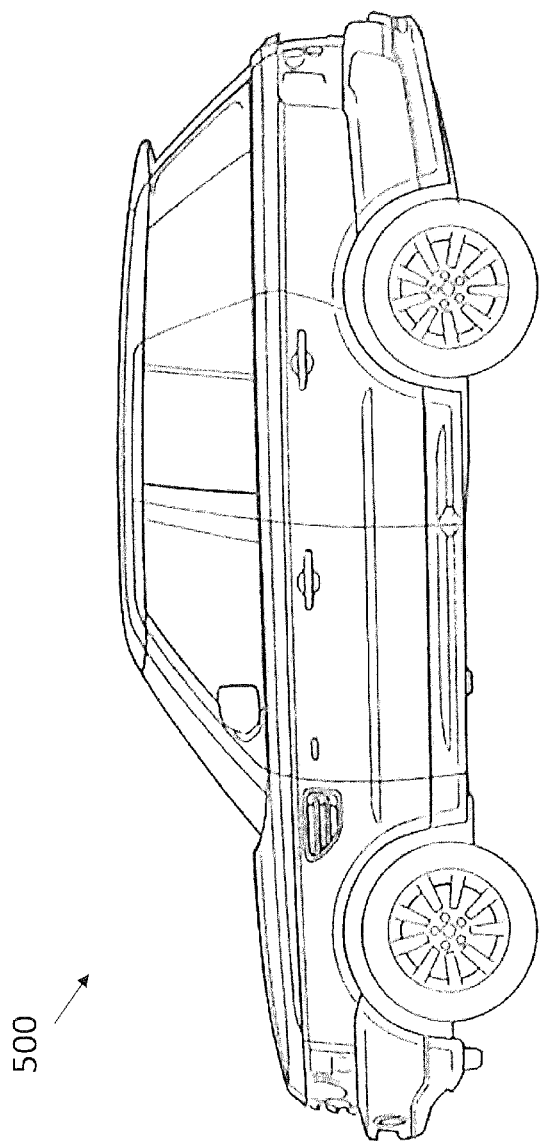
FIG. 6 shows a vehicle in an embodiment of the present invention.

FIG. 4 shows a method 300 of operating the system 200 and FIG. 5 shows a simplified map 400 showing a number of driving routes and destinations that a vehicle 500 incorporating a system according to the present invention may travel along and to. It will be understood that an electronic memory 204m of controller 204 may store instructions to cause the processing means 204p to carry out the method shown in FIG. 4. The vehicle 500 may be a vehicle as shown in FIG. 6.

The method 300 begins at the start of a journey at step 302. At this point a vehicle may be located at home location 402. The initiation of the method may be dependent on a user requesting it, or the method may be initiated at the beginning of every journey. After step 302 the method immediately proceeds to step 304, in which the controller 204 records data indicative of the energy consumption of the vehicle and GPS data indicative of the movement of the vehicle along roads 410. After recording the energy consumption and GPS data the method proceeds to step 306, in which the controller determines whether or not the leisure mode has been activated. Activation of the leisure mode may be effected by a driver via an input to the touch screen 202 or via any other suitable input means including but not limited to a voice command, a gesture command, a dedicated switch or a programmable switch.

In some embodiments a driver may indicate at the beginning of a journey that they wish for the leisure mode to be activated when they reach a particular location, for example race track 404 or one of the entrances 406A-C of off-road driving location 406. Accordingly, a user providing an indication via touch screen 202 or another input means that they wish to enter the leisure mode when the vehicle reaches a particular location, and then subsequently driving to that location, may be taken to comprise a driver input indicative of a desire to activate the leisure mode.

If the controller determines that the leisure mode has not been activated then the method returns to step 304 in which further energy consumption and GPS data is recorded. Steps 304 and 306 are then repeated until a determination that the leisure mode has been activated is made in step 306, whereupon the method proceeds to step 308.

In step 308 the system requests the user to input return journey information. The user may then input information indicative of a journey that the user wishes to complete at the end of their leisure driving session. In some embodiments the system may by default assume that the return journey will be the reverse of the journey that the user has just performed to drive to the leisure driving location. For example, if a user drives from the home location 402 to a race track 404 and activates the leisure mode upon arrival at the race track 404 then in the absence of a further input indicating that a different journey will be undertaken at the end of the leisure driving session on the race track the controller 204 may assume that the return journey is a journey from the race track 404 to the home location 402. Alternatively, the user may input a different destination to be driven to after the leisure driving session. For example, if the initial journey is from the home location 402 to first entrance 406A or off-road driving location 406 then the user may indicate that the destination of the return journey is not the home location 402 but is instead charging location 408. In this case the return journey may be taken to be a journey from the first entrance 406A of the off-road driving location to the charging location 408.

In some embodiments the start point of a return journey may be different from the location at which the leisure driving mode was activated. For example, a user may activate the leisure mode at the first entrance 406A to the off-road driving location 406, and they may indicate that the return journey will begin from the second or third entrance to the off-road driving location. For example, the user may indicate that the return journey will be from the second entrance 406B of the off-road driving location back to the home location, or they may indicate that the return journey will be from the third entrance 406C to the off-road driving location 406 to the charging location 408.

Once the return journey information has been entered in step 308 the method proceeds to step 310, in which the controller 204 determines whether or not the return journey is the reverse of the outward journey. As will be well understood by the skilled person, this will be the case only if the entered start point for the return journey is the location that the vehicle is at when the leisure mode is activated, and the entered end point is the location at which the journey initially started in step 302.

If a determination is made that the return journey is the reverse of the outward journey then the method proceeds to step 312, in which the processor 204p determines a required amount of energy that must be held in reserve at the end of the leisure driving session for the vehicle to be able to complete the return journey. The required reserve energy is calculated based on the energy usage on the outward journey, although it will be understood that correction factors may be applied based on changes in elevation between the start point and destination of the return journey or expected traffic conditions. Furthermore, a margin of safety may be added to the amount of energy used in the outward journey to ensure that any unexpected changes in conditions (for example heavier than anticipated traffic) do not result in the amount of energy held in reserve being insufficient to complete the return journey.

If a determination that the return journey is not the same as the outward journey then the method proceeds to step 314, in which the processor 204p estimates the amount of energy required to complete the return journey based on the distance between the start point and the destination of the return journey and an assumed energy consumption. The distance between that start and end points of the return journey may be calculated by the GPS system 205 or by the controller 204 using data received from the GPS system 205. The assumed energy consumption may be adjusted based upon various considerations including a user's driving style, a change in elevation on the planned return journey and a terrain type on the planned return journey. A margin of safety may be added to the amount of energy expected to be used in the return journey to ensure that any unexpected changes in conditions do not result in the amount of energy held in reserve being insufficient to complete the return journey.

After the calculation of the required reserve energy in either step 312 or step 314 the method proceeds to step 316, in which the controller 204 calculates the amount of energy available for leisure driving, and outputs an indication of the remaining amount of energy to the display 202. As shown in FIG. 2, the indication of the remaining amount of energy for leisure driving 212 may comprise a bar graph indicating an estimated distance that may be driven during the leisure driving session. The bar graph 212 may be shown to be substantially full (as is the case in FIG. 2) when the leisure mode is first initiated, and the scale may be chosen such that a substantially full bar corresponds to the total estimated range that may be driven in the leisure driving session. The bar graph will therefore indicate a progressively lower range as the leisure driving session progresses and the energy stored in the battery 208 is depleted.

In another embodiment the display shown in step 316 may indicate the amount of the energy available for leisure driving as a proportion of the amount of energy that was available for leisure driving when the leisure mode was initiated.

Optionally, a bar graph 214 or other indicator showing the overall state of charge of the battery as a proportion of a full charge (corresponding to the maximum amount of energy that can be stored in the battery) can be displayed in addition to graph 212 when the vehicle is operating in the leisure mode. In some embodiments the overall state of charge may not be displayed in the leisure mode.

After step 316 the method progresses to step 318, in which the controller determines whether or not the leisure mode has been exited. If the leisure mode has not been exited then step 316 is repeated and an updated remaining amount of energy available for leisure use is calculated and displayed on the screen 202. This continues until a determination that the leisure mode has been exited is made in step 318.

After the leisure mode has been exited the method proceeds to step 320, in which the total amount of remaining energy is continuously calculated and an indication of the total amount of remaining energy is outputted to the display. At this stage the display output may be similar to that shown in FIG. 1. The method then ends at step 322 when the journey is completed.

It will be understood that if an estimate of the remaining energy for leisure driving that is calculated in step 316 is displayed as an estimate of the remaining range then the distance that the system will estimate the vehicle to be capable of covering will be determined based on an assumed energy efficiency for the leisure mode. Such an assumed energy efficiency may be adjusted based on historic data in respect of the energy efficiency when the leisure mode is activated, and it may also be adjusted in real time during the leisure driving session based on the observed energy efficiency during the leisure driving session. The energy efficiency (in terms of energy usage per unit distance traveled) may be significantly different in a leisure driving situation such as track driving or off-road driving as compared to on road driving. Accordingly, the expected energy efficiency used in leisure mode may be quite different from the expected energy efficiency used when the vehicle is not operating in leisure mode.

In some embodiments other changes to the vehicle may be made on entry to the leisure mode. For example, in a vehicle that is designed for track performance the vehicle may enter a "Track" or "Sport" mode when the leisure mode is initiated. Initiation of the "Track" or "Sport" mode may alter the vehicle's dynamic performance, for example by altering the suspension settings or changing the mapping of the electric machine or other prime mover of the vehicle. Similarly, a vehicle that is designed for high performance in off-road situations may enter an "Off-Road" mode when the leisure mode is initiated, which mode may optimise the dynamic performance of the vehicle for off-road driving. It will be understood that the mode that is selected when the vehicle enters the leisure mode may be selected by a driver on entry to the leisure mode or when planning a journey that includes a section in which leisure mode will be used. Alternatively, the vehicle may automatically select a mode in dependence on the characteristics of the terrain on which the vehicle is driving and optionally also a driving style of a user of the vehicle. For example, a terrain response mode that modifies the dynamic performance of the vehicle so that it is particularly suited to the terrain that it is operating on may be automatically selected when the leisure mode is initiated. Examples of such terrain response modes include "Sand", "Mud and ruts", "Rock crawl" and "Grass, gravel and snow".

Although the portion of a journey that takes place after the leisure mode has been exited has been referred to as a "return" journey in the description above, it will be understood that it is not in fact necessary that the destination of the return journey is a location that the vehicle has previously visited. Although the destination of the return journey will typically be a home location, it will be understood that it could instead be any other user-selected location, which user-selected location will preferably be a location at which the vehicle may be charged or refuelled.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A controller for indicating a residual driving range available in a battery of an electric vehicle, the controller comprising:
   a first input arranged to receive an input indicative of a state of charge of a battery of the vehicle;
   a second input arranged to receive a user input;

an output arranged to cause an output to be displayed to a user of the vehicle; and a processor arranged to communicate with said first and second inputs and said output, wherein:

the controller is operable in a first mode wherein the processor is arranged to instruct the output to display a first output indicative of the total amount of energy remaining in the battery;

the controller is operable to switch from the first mode to a second mode upon receipt of a user input via said second input, wherein the second mode is a leisure mode in which a dynamic performance of the vehicle is altered and the user input is indicative of a desire to transition the vehicle into the leisure mode;

the controller is operable when switching from the first mode to the second mode to calculate an amount of reserve energy for a return journey to a journey start point based on actual energy usage between the journey start point and activation of the leisure mode; and the controller is operable in the second mode wherein the processor is arranged to instruct the output to display a second output indicative of an amount of energy that may be used while in the leisure mode and prior to the return journey to the journey start point without causing the total amount of energy stored in the battery to reduce below an amount required to undertake the return journey.

2. A controller as claimed in claim 1, wherein the output indicative of the total amount of energy remaining in the battery comprises an estimate of the total distance that may be driven before the battery is depleted based on the input received via the first input.

3. A controller as claimed in claim 1, wherein upon receipt of the input from the user of the vehicle, the controller is configured to calculate an amount of energy required to undertake the predetermined journey, and in the second mode, the controller is arranged to instruct the output to display an output indicative of the total amount of energy remaining in the battery less the amount of energy required to undertake the predetermined journey.

4. A controller as claimed in claim 3, wherein the controller is configured to re-calculate the amount of energy required to undertake the predetermined journey during operation in the second mode.

5. A display system for a vehicle comprising a controller as claimed in claim 1 and a display operable to communicate with the output.

6. A display system as claimed in claim 5 and further comprising a user interface operable by a user to provide said user input.

7. A display system as claimed in claim 6, wherein the display is a touch screen and the user interface is the touch screen.

8. An electric vehicle comprising a controller as claimed in claim 1.

9. A method of controlling a display of an electric vehicle, the method comprising:

when operating in a first mode, displaying a first output indicative of the total energy remaining in a battery of the vehicle;

switching from the first mode to a second mode upon receipt of a user input via said second input, wherein the second mode is a leisure mode in which a dynamic performance of the vehicle is altered and the user input is indicative of a desire to transition the vehicle into the leisure mode;

when switching from the first mode to the second mode, calculating an amount of reserve energy for a return journey to a journey start point based on actual energy usage between the journey start point and activation of the leisure mode; and when operating in the second mode, displaying a second output indicative of an amount of energy that may be used while in the leisure mode and prior to the return journey to the journey start point without causing the total amount of energy stored in the battery to reduce below an amount required to undertake the return journey.

10. A method as claimed in claim 9, wherein the output indicative of the total amount of energy remaining in the battery comprises an estimate of the total distance that may be driven before the battery is depleted based on an input received from a battery controller.

11. A method as claimed in claim 9, wherein the method comprises calculating an amount of energy required to undertake the predetermined journey upon receipt of the user input, and when operating in the second mode, displaying an output indicative of the total amount of energy remaining in the battery less the amount of energy required to complete the predetermined journey.

12. A method as claimed in claim 11 and comprising re-calculating the amount of energy required to undertake the predetermined journey during operation in the second mode.

13. A method as claimed in claim 9, wherein the user input is provided via a touch screen.

14. A controller comprising:

a processor; and a memory configured to store instructions that, when executed by the processor, cause the processor to:

when operating in a first mode, display a first output indicative of the total energy remaining in a battery of the vehicle;

switch from the first mode to a second mode upon receipt of a user input via said second input, wherein the second mode is a leisure mode in which a dynamic performance of the vehicle is altered and the user input is indicative of a desire to transition the vehicle into the leisure mode;

when switching from the first mode to the second mode to calculate an amount of reserve energy for a return journey to a journey start point based on actual energy usage between the journey start point and activation of the leisure mode; and when operating in a second mode, display a second output indicative of an amount of energy that may be used while in the leisure mode and prior to the return journey to the journey start point without causing the total amount of energy stored in the battery to reduce below an amount required to undertake the return journey.

* * * * *